US012576672B2

(12) United States Patent
Naujoks

(10) Patent No.: US 12,576,672 B2
(45) Date of Patent: Mar. 17, 2026

(54) SWIVEL CASTOR ARRANGEMENT FOR A PIECE OF FURNITURE AND A BED WITH THE SWIVEL CASTOR ARRANGEMENT

(71) Applicant: Wissner-Bosserhoff GmbH, Wickede (DE)

(72) Inventor: Tobias Naujoks, Menden (DE)

(73) Assignee: Wissner-Bosserhoff GmbH, Wickede (DE)

( * ) Notice: Subject to any disclaimer, the term of this patent is extended or adjusted under 35 U.S.C. 154(b) by 44 days.

(21) Appl. No.: 18/604,101

(22) Filed: Mar. 13, 2024

(65) Prior Publication Data

US 2024/0308270 A1 Sep. 19, 2024

(30) Foreign Application Priority Data

Mar. 14, 2023 (EP) ..................................... 23161736

(51) Int. Cl.
*B60B 33/00* (2006.01)
*A47C 19/04* (2006.01)

(52) U.S. Cl.
CPC ........ *B60B 33/0002* (2013.01); *A47C 19/045* (2013.01); *B60B 33/0081* (2013.01)

(58) Field of Classification Search
CPC ............ B60B 33/0002; B60B 33/0028; B60B 33/0055; B60B 33/0094; B60B 33/0039; B60B 33/0049; B60B 33/0057; B60B 33/0068; B60B 33/0081; B60B 33/0084; B60B 33/0092; B60B 33/025; B60B 33/021; B60B 33/023; B60B 33/0042; B60B 33/0073; B60B 33/0078; B60B 33/0086; B60B 37/10; B60B 2200/222;

(Continued)

(56) References Cited

U.S. PATENT DOCUMENTS 2,560,704 A * 7/1951 Sebel ...................... B60B 33/02
280/1.182
3,751,758 A * 8/1973 Higbee ................... B60B 33/02
16/35 R (Continued)

FOREIGN PATENT DOCUMENTS

CN 204106412 U 1/2015
DE 3203886 C2 * 3/1984

(Continued)

*Primary Examiner* — Chuck Y Mah
(74) *Attorney, Agent, or Firm* — Edell, Shapiro & Finnan, LLC

(57) ABSTRACT

A swivel castor arrangement for a piece of furniture comprises: a holder; a swivel castor including a wheel mounted rotatably about a first axis on a frame mounted rotatably about a second axis on the holder; and a U-shaped bracket having a web connecting two legs attached rotatably about a third axis. The bracket is pivotable about the third axis between first and second positions and is movable into the second position when the first and third axes are substantially parallel. The wheel is arranged in the second position between the bracket legs such that free rotation of the frame about the second axis is restricted, and the wheel in the first position is not arranged between the bracket legs such that free rotation of the frame about the second axis is possible. The bracket is pivotable by less than 90° to switch between the first and second positions.

13 Claims, 9 Drawing Sheets

(58) Field of Classification Search
CPC .......... B60B 2200/242; B60B 2200/24; B60B
2200/43; B60B 2900/531; B60B 2380/12;
A61G 7/0528; A47C 7/006; F16D 49/00;
F16D 65/42; F16D 2121/14; F16D
2125/32
See application file for complete search history.

(56) References Cited

U.S. PATENT DOCUMENTS

| | | | | |
|---|---|---|---|---|
| 3,881,216 | A * | 5/1975 | Fontana | B60B 33/021 |
| | | | | 188/31 |
| 4,037,291 | A * | 7/1977 | Huempfner | B60B 33/025 |
| | | | | 16/35 R |
| 4,385,414 | A * | 5/1983 | Damico | A61G 7/0528 |
| | | | | 16/35 R |
| 5,675,864 | A * | 10/1997 | Chou | B60B 33/021 |
| | | | | 16/35 R |
| 5,829,096 | A * | 11/1998 | Perry | B60B 33/0081 |
| | | | | 16/35 R |
| 6,453,508 | B1 * | 9/2002 | Denner | B60B 33/0018 |
| | | | | 16/35 R |
| 8,205,297 | B2 * | 6/2012 | Fallshaw | B60B 33/0073 |
| | | | | 16/35 R |
| 8,973,217 | B2 * | 3/2015 | Weichbrodt | B60B 33/0042 |
| | | | | 16/35 R |
| 2004/0194221 | A1 * | 10/2004 | Thompson | B60B 33/0049 |
| | | | | 16/35 R |
| 2019/0001747 | A1 * | 1/2019 | Lyon | B60B 33/0089 |

FOREIGN PATENT DOCUMENTS

| | | | |
|---|---|---|---|
| DE | 4442449 | A1 | 10/1995 |
| GB | 1127690 | A | 9/1968 |

* cited by examiner

SWIVEL CASTOR ARRANGEMENT FOR A PIECE OF FURNITURE AND A BED WITH THE SWIVEL CASTOR ARRANGEMENT

CROSS REFERENCE TO RELATED APPLICATIONS

This application claims priority under 35 U.S.C. § 119 (a)-(d) to European application No. 23161736.6 filed on Mar. 14, 2023, the entire contents of which are hereby incorporated by reference.

TECHNICAL FIELD

The present disclosure relates to a swivel castor arrangement for a piece of furniture, in particular for a bed. The present disclosure further relates to a bed, in particular a nursing bed, with at least one such swivel castor arrangement.

BACKGROUND

Joerns Healthcare LLC, Arlington, Texas, USA, produces a nursing bed with such a swivel castor arrangement under the name "EasyCare." The bed's swivel castors allow the bed to be moved in all directions. They enable the bed to be pushed in a transverse direction, for example. This makes it easy to maneuver the bed in a small space. This is an advantage if the bed needs to be parked.

However, the free rotation of the castors about the second axis of rotation is disadvantageous if the bed is to be driven straight ahead for a longer distance. Then it is an advantage if both ends of the bed cannot be moved transversely to the direction of travel. With the "EasyCare" it is therefore provided that the free rotation of the swivel castors at one end of the bed is restricted by the bracket. This improves the straight-line stability of the bed over longer distances, for example in a hallway of a care facility.

The bracket serves to prevent or at least restrict rotation of the swivel castors about the second axis of rotation. This ensures that the wheels function like fixed castors.

To enable the rotation of the swivel castors about the second axis of rotation, the brackets of the swivel castor arrangements are folded up and folded over so that they can be placed on an upper side of the holder. In order for this folding over of the brackets to be possible, the space required for folding over the brackets must remain free. The space is not available for any other design of the castor arrangement.

SUMMARY

This is where the disclosed swivel castor arrangement comes into play. A swivel castor arrangement for a piece of furniture, comprising: a holder; a first swivel castor including at least one wheel and one frame, wherein: the wheel is mounted rotatably about a first axis of rotation on the frame, the frame is mounted at least indirectly rotatably about a second axis of rotation on the holder, and the first axis of rotation lies in a first plane and the second axis of rotation is perpendicular to the first plane; and a U-shaped bracket having first and second legs and a web connecting the first and second legs, wherein: the first and second legs are attached at least indirectly rotatably about a third axis of rotation to the holder, which third axis of rotation lies in the first plane or in a plane that is parallel to the first plane, the U-shaped bracket being pivotable about the third axis of rotation between a first position and a second position, and the U-shaped bracket being movable into the second position when the first axis of rotation and the third axis of rotation are substantially parallel or coincide. The wheel is arranged in the second position between the first and second legs of the U-shaped bracket such that the free rotation of the frame about the second axis of rotation is restricted, and the wheel in the first position is not arranged between the first and second legs of the U-shaped bracket such that free rotation of the frame about the second axis of rotation is possible. The U-shaped bracket is pivotable by less than 90° to change from the first position to the second position, and vice versa. The swivel castor arrangement further has holding elements capable of holding the U-shaped bracket in the first position.

The disclosed swivel castor arrangement is based on the object of changing the known swivel castor arrangement such that more options for designing the swivel castor arrangement are possible.

This object is achieved according to the disclosed swivel castor arrangement in that:

a. the bracket is pivotable by less than 90° to change from the first position to the second position, and vice versa, and b. the swivel castor arrangement further has holding elements which can hold the bracket in the first position.

Unlike the brackets of the bed known from the prior art and described at the outset, the bracket, when it is pivoted into the first position to release the rotation of the swivel castor about the second axis of rotation, is not folded over, but is only pivoted upwards at least as far as that the swivel castor can be pivoted freely about the second axis of rotation again and that the castors do not hit the legs of the bracket. The angle through which the bracket is pivoted from its second position to its first position can be significantly smaller than 90°. The angle can be, for example, 40°, in particular 43° to 47°.

The legs of a bracket of a swivel castor arrangement according to the disclosure can have an arc between the connection points between the web and the legs and the third axis of rotation. The arc can in particular be an upward arc. This upward arc can be useful if the wheel is not or is not yet blocked by the bracket, but should be brought into a blocked position between the legs of the bracket by rotating about the second axis of rotation.

The legs of a bracket of a swivel castor arrangement according to the disclosure can protrude beyond the third axis of rotation when viewed from the web. A first holding element can be provided in the part of at least one leg that protrudes beyond the third axis of rotation. It is also possible for a first holding element to be provided in the part of both legs that protrudes beyond the third axis of rotation.

In the first position of the bracket, the first holding element can cooperate with a second holding element which is attached to the holder to hold the bracket in the first position.

The holding elements can form or have a ball latch, a magnetic latch, a pressure magnetic latch, a spring latch, a clamping device, for example a rubber buffer. In particular, the first holding element can have a recess and the second holding element can be a ball latch. The recess and the ball latch can cooperate to hold the bracket in the first position.

In the part of at least one leg of the bracket of a swivel castor arrangement according to the disclosure that protrudes beyond the third axis of rotation, an arcuate elongated hole can be provided, the edge of which holds a ball of the ball latch when the bracket is not in the first position. As a result, the ball of the ball latch cannot fall out of the latch, which is possible depending on the design of the ball latch.

The bracket of a swivel castor arrangement according to the disclosure can have a tab which protrudes outwards from the web and forms a pedal for actuating the bracket. The pedal makes it easier to operate the bracket with a foot. The pedal can be pressed with the foot or it can be lifted by pressing the pedal from below with the foot.

A swivel castor arrangement according to the disclosure can have a hood which is placed over the holder and from the opening of which the swivel castor and the bracket or parts of the swivel castor and the bracket protrude.

A swivel castor arrangement according to the disclosure can have a second swivel castor. Like the first swivel castor, this second swivel castor can have a wheel and a frame, wherein the wheel is attached rotatably about a fourth axis of rotation to the frame, which fourth axis of rotation is parallel to the first axis of rotation, and wherein the frame is attached at least indirectly rotatably about a fifth axis of rotation to the holder, which fifth axis of rotation is perpendicular to the first plane. The first and second swivel castors can be identical in construction.

A swivel castor arrangement according to the disclosure can be part of a bed according to the disclosure, in particular a medical bed, which has a base frame and an upper frame. The upper frame can have a support for a mattress. The base frame can have struts and/or supports via which the upper frame is supported on a floor. The base frame can have the swivel castor arrangement and, as appropriate, can be moved on the floor with same or different swivel castor arrangements or wheels according to the disclosure or not according to the disclosure.

The base frame of such a bed may have a mechanism for raising and lowering the upper frame. It is also possible for the upper frame to have one or more mechanisms for tilting or raising or lowering parts of the support for the mattress. The bed may have one or more drives for operating the mechanism or mechanisms.

BRIEF DESCRIPTION OF THE DRAWINGS

Further features and advantages of an exemplary embodiment of the disclosed swivel castor arrangement are described below with reference to the drawings.

DETAILED DESCRIPTION

It is not necessary for a swivel castor arrangement according to the disclosure to have all of the features described below. It is also possible for a swivel castor arrangement according to the disclosure to have only individual features of the exemplary embodiment described below.

Figure 1:
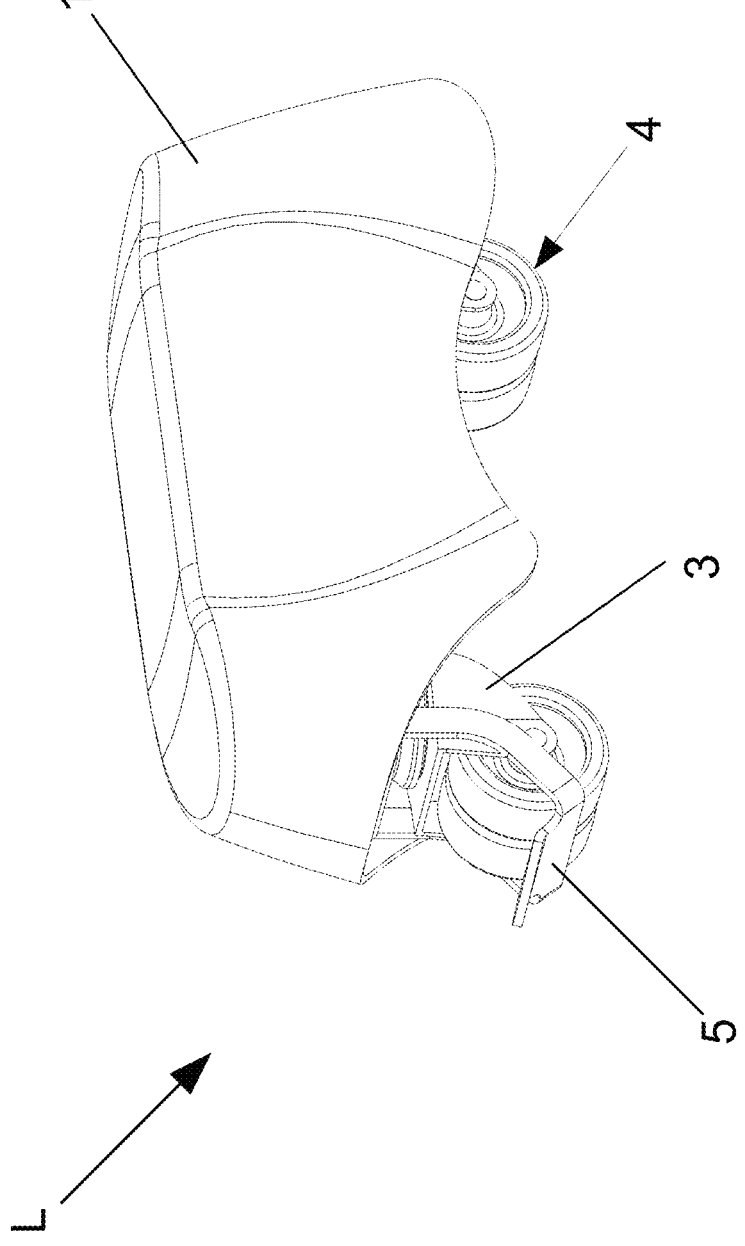
FIG. 1 shows a perspective view of a swivel castor arrangement according to the disclosure with a swivel castor locked.
Figure 2:
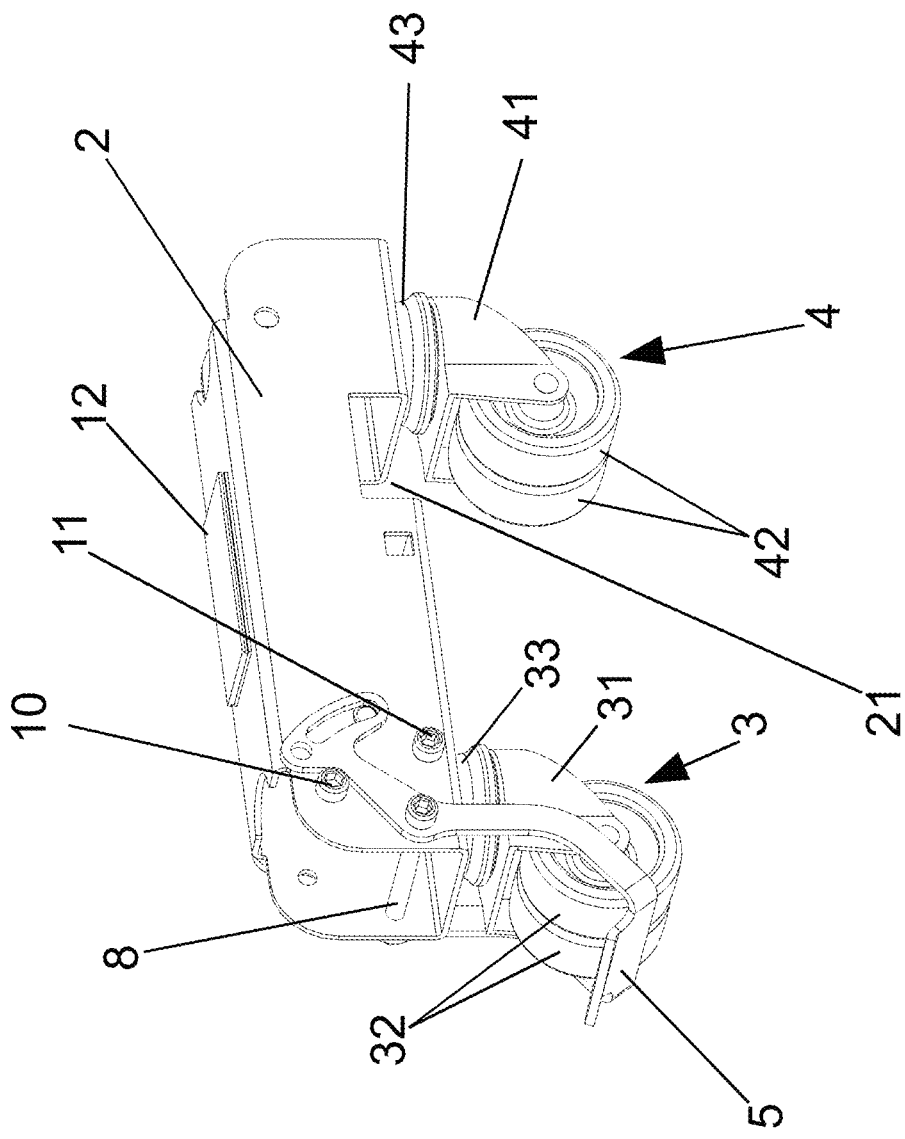
FIG. 2 shows a view corresponding to FIG. 1 of the swivel castor arrangement with the swivel castor locked but without a hood.
Figure 2A:
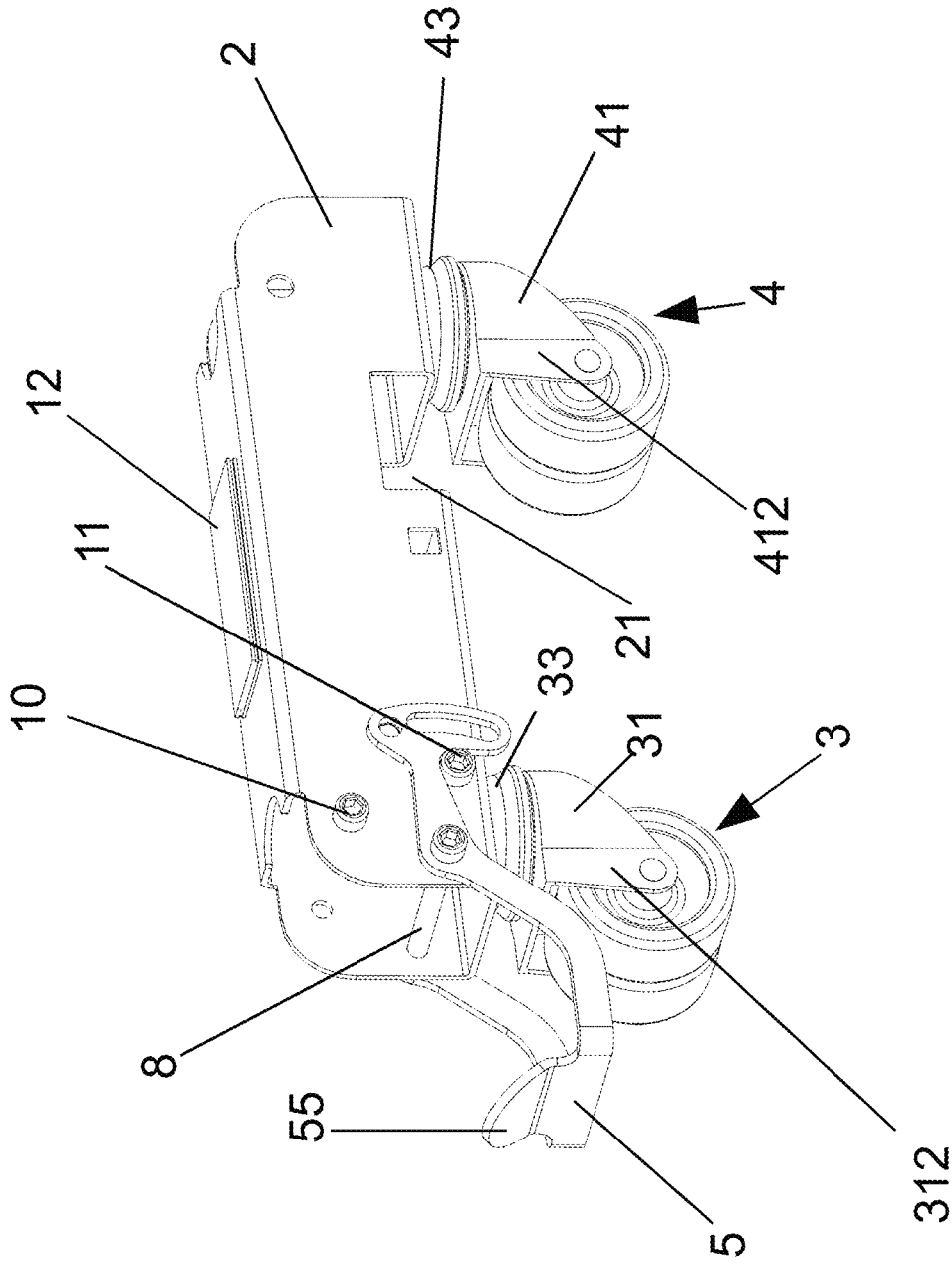
FIG. 2a shows a view corresponding to FIG. 2 of the swivel castor arrangement without a hood with the swivel castor being freely rotatable.
Figure 2B:
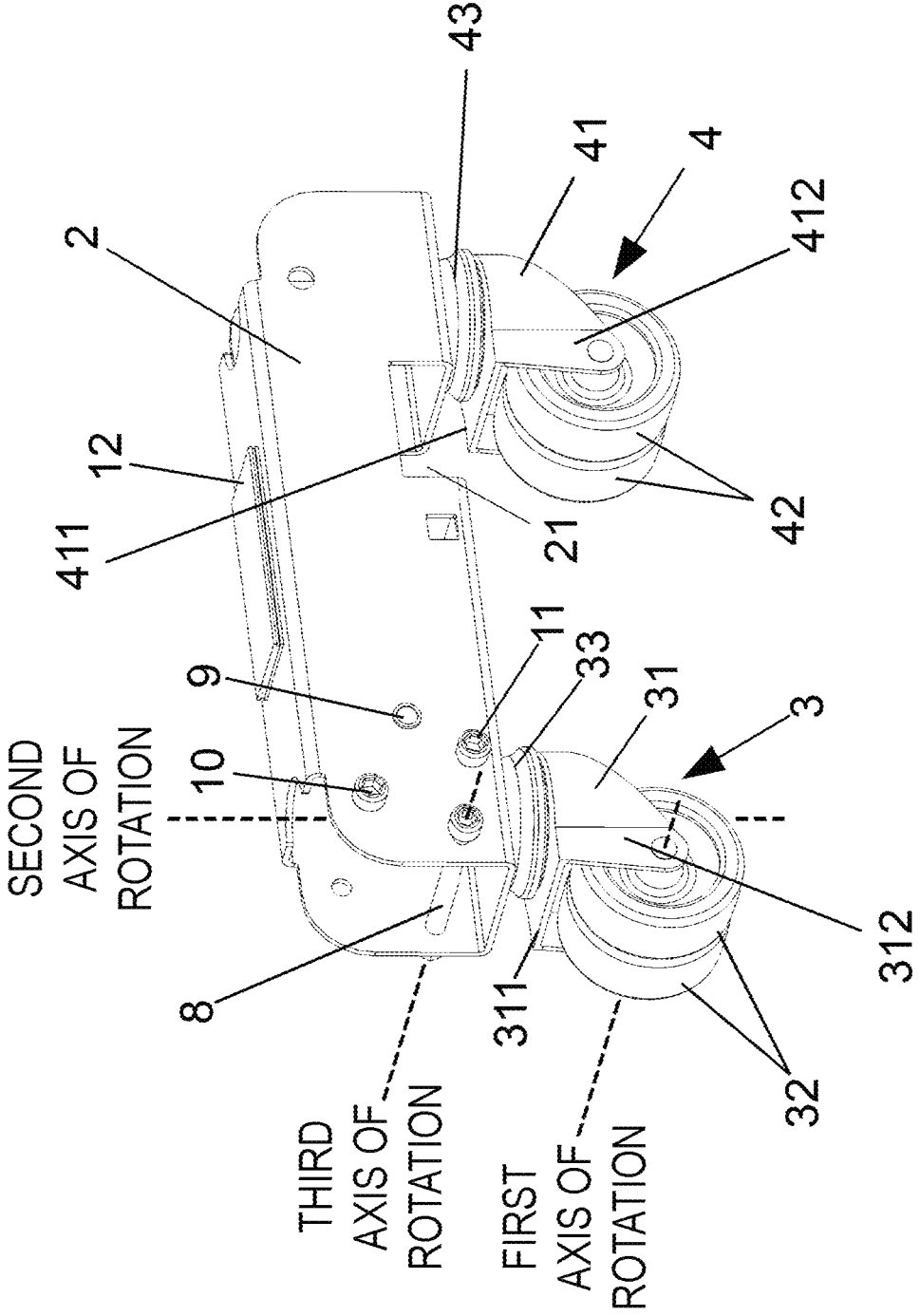
FIG. 2b shows a view corresponding to FIG. 2 of the swivel castor arrangement without hood and without bracket.
Figure 3:
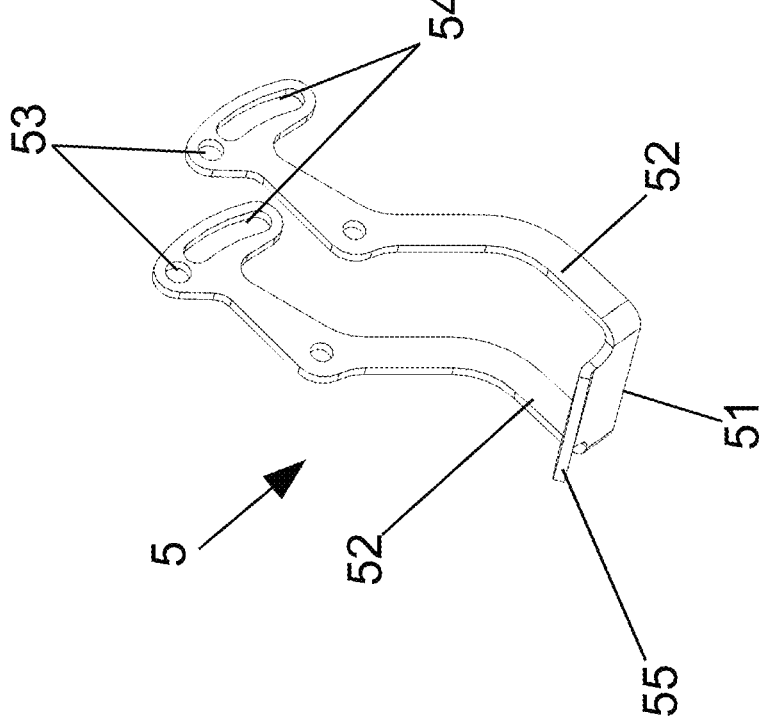
FIG. 3 shows a perspective view of the bracket of the swivel castor arrangement according to the disclosure without a hood and with the swivel castor locked.
Figure 4:
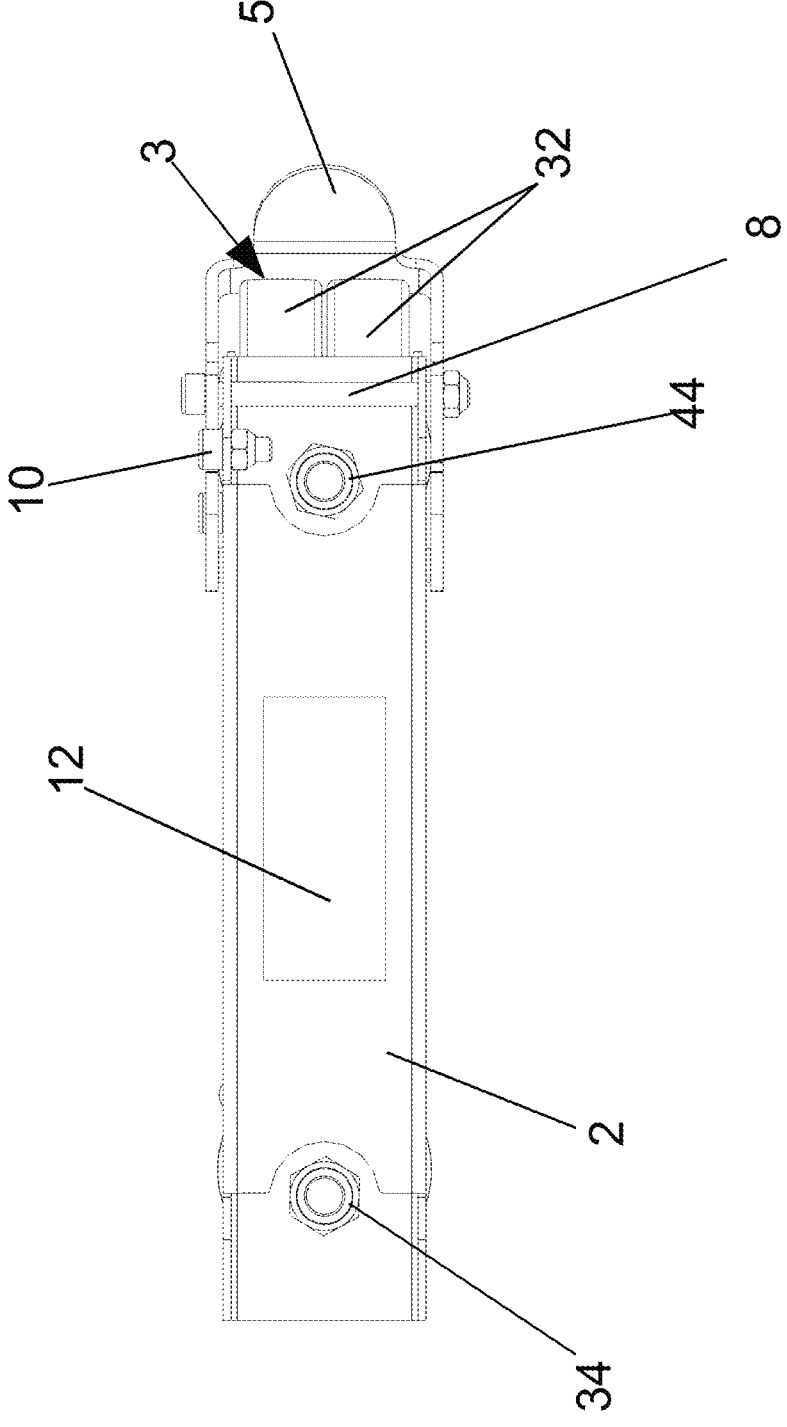
FIG. 4 shows a top view of the swivel castor arrangement without a hood and with the swivel castor locked.
Figure 5:
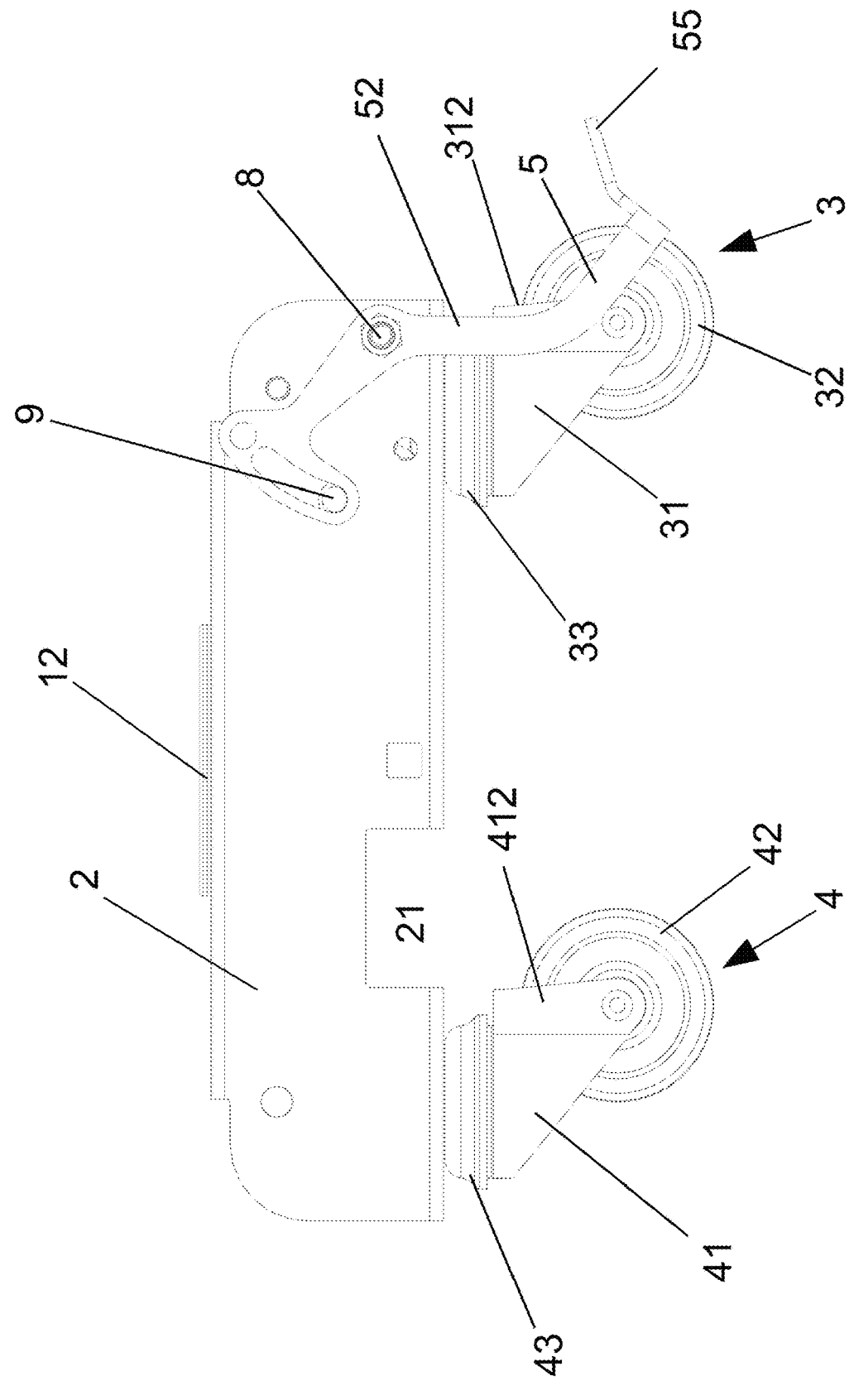
FIG. 5 shows a side view of the swivel castor arrangement without a hood and with the swivel castor locked.
Figure 6:
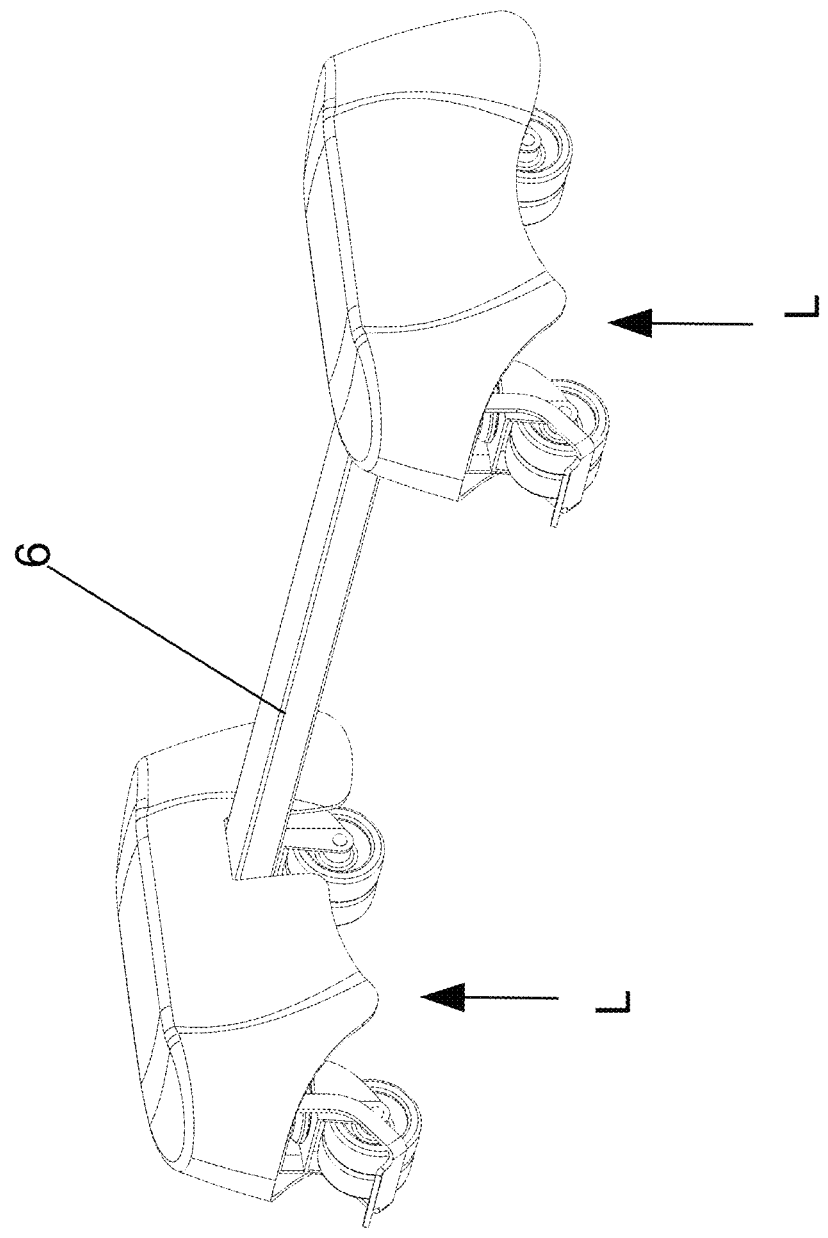
FIG. 6 shows a carriage with two swivel castor arrangements according to the disclosure from FIGS. 1 to 5 for a bed according to the disclosure.
Figure 7:
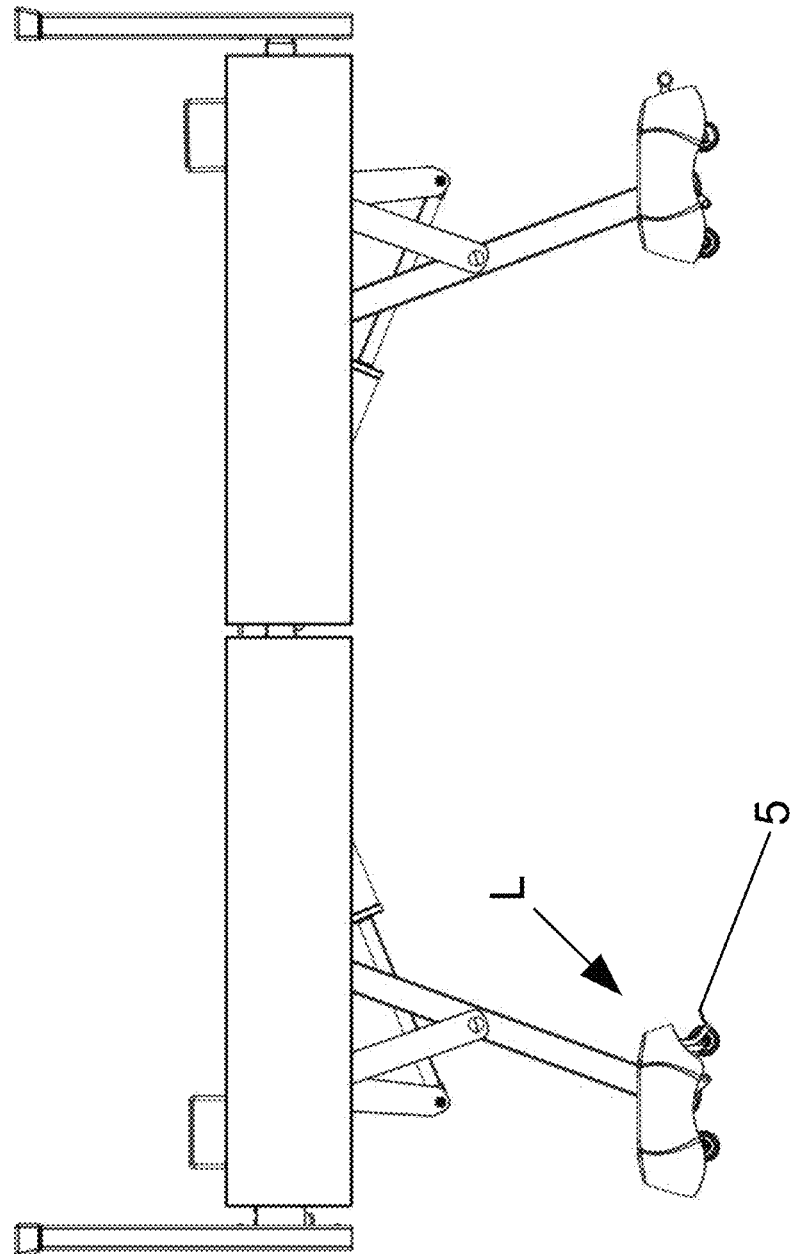
FIG. 7 shows a bed according to the disclosure with the carriage from FIG. 6.

Referring to FIGS. 1, 2, 2a, 2b, and 3-7, the swivel castor arrangement L according to the disclosure has a hood 1, a holder 2, a first swivel castor 3, a second swivel castor 4 and a bracket 5.

The holder 2 is made from a section of a square tube. Various recesses and holes have been created in the section through machining. Below, there is a notch 21 into which another rectangular tube 6 can be inserted, which connects two swivel castor arrangements L according to the disclosure, which together with the other rectangular tube 6 can form the carriage of the bed B according to the disclosure shown in FIG. 6. The two holders 2 and the other rectangular tube 6 can be connected to one another by welding.

On an underside of holder 2, first and second swivel castors 3, 4 are attached in areas adjacent to the longitudinal ends of holder 2. Swivel castors 3, 4 each have a frame 31, 41. A wheel 32, 42 is mounted rotatably about a first axis of rotation in each frame. The first axes of rotation lie in a plane which is parallel to the floor on which the swivel castor arrangement L can move. The frames are substantially U-shaped and each have a web 311, 411 and two legs 312, 412, which run parallel to one another and are connected to ends of the web of respective frame 31, 42.

Frame 31, 41 of each swivel castor 3, 4 is connected to holder 2 via a pivot bearing 33, 43, which is screwed to holder 2 with screws 34, 44, so that frame 31, 41 can rotate about a second axis of rotation. The second axes of rotation are perpendicular to the plane in which the first axes of rotation lie. The second axis of rotation of each of swivel castors 3, 4 are skewed to the first axes of rotation of respective swivel castors 3, 4.

The rotation of frame 31 of first swivel castor 3 about the second axis of rotation can be blocked or restricted. Bracket 5 is provided for this purpose. Bracket 5 has a web 51 and two legs 52. Web 51 and legs 52 are arranged in a U-shape relative to one another. Legs 52 connect to ends of web 51. The legs are parallel to one another, and the distance between legs 52 corresponds to the width of the square tube that forms holder 2.

The bracket is mounted pivotably about a third axis of rotation on holder 2. For this purpose, holder 2 has two aligning bores through side walls at the end of the square tube to which first swivel castor 3 is attached. Legs 52 of bracket 5 each have a bore that is also aligned. Bracket 5 is arranged on holder 2 so that the bores in legs 52 of bracket 5, and the bores in the side walls are aligned. A screw 8 is inserted through the bores and secured with a nut. This screw 8 forms the third axis of rotation about which bracket 5 can pivot.

Legs 52 are not straight, but curved in an S shape. They have an upward arc between the connection points with web 51 and the third axis of rotation, and a downward arc between the third axis of rotation and their free ends, i.e., in a part of legs 52 that protrudes beyond the third axis of rotation. A first holding element 53 and an arcuate elongated hole 54 are provided at the end of each leg, the arcuate elongated hole 54 lying on an imaginary ring around the third axis of rotation. First holding element 53 is formed by a circular hole, which also lies on the imaginary ring around the third axis of rotation.

First holding mechanism 53 cooperates with a second holding mechanism 9. Second holding mechanism 9 is formed by a ball latch which is inserted into a bore in the side wall of the square tube.

Bracket 5 can be pivoted between two positions. In the first position, a ball of ball latch 9 is snapped into first holding mechanism 53. In this first position, wheel 32 of first swivel castor 3 can be rotated freely. Wheel 32 has a pivoting range that must be free so that it can rotate freely.

In the second position, web 51 and the parts of legs 52 that do not protrude beyond the third axis of rotation are lowered compared to the first position. The bracket can be pivoted downwards by a force that pushes the web downwards. The force also pushes the ball of the ball latch out of first holding elements 53. By pressing down web 51, legs 52 come into a pivoting range of wheel 32 of first swivel castor 3. The pivoting range of wheel 32 and a pivoting range of legs 52 intersect. It should be understood that both cannot be in the intersecting area at the same time.

The first position and the second position are further defined by two stops, which are formed by screws 10, 11, against which bracket 5 rests in the two positions.

Three cases can be distinguished here, namely:
a. that wheel 32 is not in the pivoting range of the legs when web 51 is pressed down and is positioned such that the legs will be on both sides of wheel 32 when web 52 is lowered,
b. that wheel 32 is in the pivoting range of the legs when web 51 is pressed down, and
c. that wheel 32 is not in the pivoting range of the legs when web 51 is pressed down and is positioned such that the legs will not be on both sides of wheel 32 when web 52 is lowered.

In case a, the bracket can readily reach its second position. The ball of the ball latch then slides in elongated hole 54 to the lower end thereof. The second position of the bracket is defined by the lower end of elongated hole 54. Legs 52 of bracket 2 arranged on both sides of wheel 32 restrict a rotation of frame 31 and thus of wheel 32 about the second axis of rotation. A rotation of the swivel castor is thus blocked and swivel castor 3 then behaves largely like a fixed castor, which improves the straight running of the swivel castor arrangement and a piece of furniture equipped with it, in particular a bed.

In case b, bracket 5 falls onto wheel 32, which is located in the pivoting range of one of legs 52 of the bracket. The bracket can then not reach its second position. Although the ball of the ball latch is in the slot, it will not reach the lower end thereof. A rotation of wheel 32 about the second axis of rotation is then not impeded or blocked. If, in case b, wheel 32 is rotated about the second axis of rotation, it moves below the bracket. Wheel 32 can be rotated about the second axis of rotation so that it will be out of the pivoting range of legs 52. The bracket can then move down. In this case, wheel 32 can be rotated so that the legs will be on both sides of wheel 32 when web 52 is lowered. Then case a arises and rotation of wheel 32 about the second axis of rotation is impeded or blocked.

However, wheel 32 can be rotated so that the legs will not be on both sides of wheel 32 when web 52 is lowered. Then case c arises, which will now be presented.

If, in case c, wheel 32 is rotated about the second axis of rotation, it may come into the pivoting range of one of legs 52 leg 32, in which this leg is then also in the second position of the bracket. However, further rotation of wheel 32 about the second axis of rotation is then not blocked. Rather, the wheel presses against leg 52 such that the bracket is raised. This is possible in particular due to the upward arc of the leg in this area where wheel 32 comes into contact with leg 52. If wheel 32 is then rotated further in the same direction, it is rotated away from under leg 52 so that it will be in the area between legs 52 and then case a arises. Even then wheel 32 is blocked by the legs.

In cases b and c, the rotation of wheel 32 about the second axis of rotation in order to get the wheel between legs 52 of bracket 5 can be achieved by moving the swivel castor arrangement or the piece of furniture to which the swivel caster arrangement is attached on the floor, especially in the direction in which wheel 32 is to be locked.

Bracket 5 has a tab 55 which protrudes outwards from the web. This tab 55 forms a pedal, which makes it easier to operate the bracket with the foot.

On the top of the square tube forming holder 2 and the inside of hood 1, cooperating parts 12 of a Velcro fastener are arranged, via which hood 1 and holder 2 are connected to one another when hood 1 is placed over holder 2.

What is claimed is:

1. A swivel castor arrangement for a piece of furniture, comprising:
a holder;
a first swivel castor including at least one wheel and one frame, wherein: the wheel is mounted rotatably about a first axis of rotation on the frame, the frame is mounted rotatably about a second axis of rotation on the holder, and the first axis of rotation lies in a first plane and the second axis of rotation is perpendicular to the first plane; and
a U-shaped bracket having first and second legs and a web connecting the first and second legs, wherein: the first and second legs are attached rotatably about a third axis of rotation to the holder, which third axis of rotation is parallel to the first plane, the U-shaped bracket is pivotable about the third axis of rotation between a first position and a second position, and the U-shaped bracket is movable into the second position when the first axis of rotation and the third axis of rotation are substantially parallel, wherein:
in the second position of the U-shaped bracket, the wheel is arranged between the first and second legs of the U-shaped bracket such that free rotation of the frame about the second axis of rotation is restricted, and in the first position of the U-shaped bracket, the wheel is not arranged between the first and second legs of the U-shaped bracket such that free rotation of the frame about the second axis of rotation is possible,
the U-shaped bracket is pivotable by less than 90° to change from the first position to the second position, and vice versa, and
the swivel castor arrangement further has holding elements capable of holding the U-shaped bracket in the first position.

2. The swivel castor arrangement of claim 1, wherein the first and second legs have an arc between connection points between the web and the third axis of rotation.

3. The swivel castor arrangement of claim 1, wherein the first and second legs protrude beyond the third axis of rotation when viewed from the web, and a first holding element is provided in a portion of the first or second leg protruding beyond the third axis of rotation.

4. The swivel castor arrangement of claim 3, wherein in the first position of the U-shaped bracket, the first holding element cooperates with a second holding element which is attached to the holder in order to hold the U-shaped bracket in the first position.

5. The swivel castor arrangement of claim 4, wherein the first and second holding elements form or have a ball latch, a magnetic latch, a pressure magnetic latch, or a spring latch.

6. The swivel castor arrangement of claim 4, wherein the first holding element has a recess and the second holding element is a ball latch.

7. The swivel castor arrangement of claim 6, wherein an arcuate elongated hole is provided in the portion of the first or second leg protruding beyond the third axis of rotation, an edge the arcuate elongated hole holding a ball of the ball latch when the U-shaped bracket is not in the first position.

8. The swivel castor arrangement of claim 1, wherein the U-shaped bracket has a tab that protrudes outwards from the web and forms a pedal for actuating the U-shaped bracket.

9. The swivel castor arrangement of claim 1, further comprising a hood over the holder, the first swivel castor and the U-shaped bracket protruding from an opening in the hood.

10. The swivel castor arrangement of claim 1, further comprising:

a second swivel castor having a second wheel and a second frame, wherein the second wheel is attached rotatably about a fourth axis of rotation to the second frame, the fourth axis of rotation being parallel to the first axis of rotation, and wherein the second frame is attached rotatably about a fifth axis of rotation to the holder, the fifth axis of rotation being perpendicular to the first plane.

11. A bed, comprising:

a base frame and an upper frame, the upper frame having a support for a mattress and the base frame having struts and/or supports via which the upper frame is supported on a floor, the base frame including the swivel castor arrangement of claim 1 by which the bed is moveable on the floor.

12. The bed of claim 11, wherein the base frame includes a mechanism for raising and lowering the upper frame.

13. The bed of claim 11, wherein the upper frame includes one or more mechanisms for tilting or raising or lowering parts of the support for the mattress.

* * * * *